US007813729B2

(12) United States Patent
Lee et al.

(10) Patent No.: US 7,813,729 B2
(45) Date of Patent: Oct. 12, 2010

(54) SYSTEM AND METHOD FOR ASSOCIATING A WIRELESS MOBILE COMMUNICATIONS DEVICE WITH A SPECIFIC VEHICLE

(75) Inventors: Donald B. Lee, Shoreline, WA (US); Bradley J. Mitchell, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1069 days.

(21) Appl. No.: 11/530,216

(22) Filed: Sep. 8, 2006

(65) Prior Publication Data

US 2008/0064332 A1 Mar. 13, 2008

(51) Int. Cl.
*H04W 4/00* (2009.01)
(52) U.S. Cl. .................. 455/431; 455/507; 455/508; 455/524
(58) Field of Classification Search .......... 455/431, 455/507, 508, 524, 115, 126, 67.1, 41.2
See application file for complete search history.

(56) References Cited

U.S. PATENT DOCUMENTS

| | | | | |
|---|---|---|---|---|
| 4,122,522 A | * | 10/1978 | Smith | 701/15 |
| 4,903,298 A | * | 2/1990 | Cline | 380/270 |
| 5,070,320 A | * | 12/1991 | Ramono | 340/539.11 |
| 5,235,320 A | * | 8/1993 | Romano | 340/539.11 |
| 5,506,567 A | * | 4/1996 | Bichlmaier et al. | 340/555 |
| 5,552,759 A | * | 9/1996 | Stoyka | 340/426.33 |
| 5,563,952 A | * | 10/1996 | Mercer | 381/56 |
| 5,880,363 A | * | 3/1999 | Meyer et al. | 73/146.5 |
| 6,489,886 B2 | * | 12/2002 | Meier | 340/426.1 |
| 6,577,419 B1 | * | 6/2003 | Hall et al. | 398/115 |
| 6,650,897 B2 | * | 11/2003 | Nelson | 455/431 |
| 6,710,546 B2 | * | 3/2004 | Crenshaw | 315/86 |
| 6,788,935 B1 | * | 9/2004 | McKenna et al. | 455/431 |
| 6,828,733 B1 | * | 12/2004 | Crenshaw | 315/150 |
| 6,828,905 B2 | * | 12/2004 | Normann et al. | 340/447 |
| 6,829,926 B2 | * | 12/2004 | Cantu et al. | 73/146.4 |
| 6,949,002 B2 | * | 9/2005 | Yamaguchi et al. | 446/454 |
| 6,950,627 B2 | * | 9/2005 | Vicari | 455/41.2 |
| 6,960,994 B2 | * | 11/2005 | Tabata et al. | 340/442 |
| 6,965,816 B2 | * | 11/2005 | Walker | 701/16 |
| 7,009,995 B1 | * | 3/2006 | Bohrer et al. | 370/460 |
| 7,075,433 B2 | * | 7/2006 | Singer | 340/568.1 |

(Continued)

OTHER PUBLICATIONS

The Boeing Company, International Search Report, corresponding to International Patent Application No. PCT/US2007/018439 dated Dec. 11, 2007.

(Continued)

*Primary Examiner*—Minh D Dao
(74) *Attorney, Agent, or Firm*—Charles L. Moore; Moore & Van Allen, PLLC (57) ABSTRACT

A communications system may include a first transceiver and a second transceiver both mountable to a vehicle. The first transceiver may include a range substantially limited to a close proximity of the vehicle. The communications system may also include a mobile communications device. The mobile communications device may be adapted to receive a signal from the first transceiver when within the range of the first transceiver. The signal may include information useable by the mobile communications device for configuration of the mobile communications device for two-way communications with the second transceiver.

34 Claims, 4 Drawing Sheets

U.S. PATENT DOCUMENTS

| | | | |
|---|---|---|---|
| 7,149,551 B2 | 12/2006 | Kim | |
| 7,303,459 B2* | 12/2007 | Yamaguchi | 446/454 |
| 7,426,275 B2* | 9/2008 | Sugawara | 380/264 |
| 7,433,773 B2* | 10/2008 | Tengler et al. | 701/100 |
| 7,474,214 B2* | 1/2009 | Bauchot et al. | 340/572.1 |
| 7,515,040 B2* | 4/2009 | Mori et al. | 340/442 |
| 7,562,167 B2* | 7/2009 | Anderson | 710/38 |
| 2001/0035813 A1* | 11/2001 | Meier | 340/5.72 |
| 2002/0044069 A1* | 4/2002 | Jenkinson | 340/928 |
| 2002/0078741 A1* | 6/2002 | Cantu et al. | 73/146 |
| 2002/0178163 A1* | 11/2002 | Mayer | 707/10 |
| 2003/0109972 A1* | 6/2003 | Tak | 701/29 |
| 2003/0156021 A1* | 8/2003 | Tabata et al. | 340/442 |
| 2004/0032325 A1* | 2/2004 | Singer | 340/539.1 |
| 2004/0083374 A1* | 4/2004 | Sugawara | 713/189 |
| 2004/0208603 A1 | 10/2004 | Hekkel et al. | |
| 2005/0128053 A1* | 6/2005 | Bareither et al. | 340/5.64 |
| 2005/0227579 A1* | 10/2005 | Yamaguchi et al. | 446/308 |
| 2005/0253737 A1* | 11/2005 | Schweers | 340/932.2 |
| 2006/0000616 A1 | 1/2006 | Crawford | |
| 2006/0106671 A1* | 5/2006 | Biet | 705/13 |
| 2006/0155430 A1 | 7/2006 | Burgess | |
| 2006/0166717 A1 | 7/2006 | Seshadri et al. | |
| 2006/0166718 A1 | 7/2006 | Seshadri et al. | |
| 2006/0200379 A1* | 9/2006 | Biet | 705/13 |
| 2007/0008097 A1* | 1/2007 | Mori et al. | 340/505 |
| 2007/0083296 A1* | 4/2007 | Tengler et al. | 701/1 |
| 2007/0197261 A1* | 8/2007 | Humbel | 455/558 |
| 2008/0061932 A1* | 3/2008 | Hermann | 340/5.72 |
| 2008/0318622 A1* | 12/2008 | Jen | 455/552.1 |
| 2009/0121840 A1* | 5/2009 | Bauchot et al. | 340/10.1 |
| 2009/0237228 A1* | 9/2009 | Watabe | 340/447 |

OTHER PUBLICATIONS

The Boeing Company, Written Opinion, corresponding to International Patent Application No. PCT/US2007/018439 dated Dec. 11, 2007.

Earmark, Wireless Intercoms—Radio Headsets—Headset Communications, www.earmark.com/products/headphones.html, May 24, 2007, pp. 1-3.

* cited by examiner

SYSTEM AND METHOD FOR ASSOCIATING A WIRELESS MOBILE COMMUNICATIONS DEVICE WITH A SPECIFIC VEHICLE

FIELD OF THE INVENTION

The present invention relates to wireless communications and more particularly to a system and method for associating a wireless communications device with a specific vehicle, such as an aerospace vehicle, watercraft, terrestrial vehicle or the like.

BACKGROUND OF THE INVENTION

Communications between support personnel, crew members and others associated with servicing a large vehicle, such as an airliner, a ship or other vehicle can be important to the efficient and safe servicing and support of such vehicles. This is perhaps no more important than in the airline industry. Airplane ground crews typically communicate with the pilots, gate crews, and operations centers via headsets. These headsets currently require long-lead cables, which plug into outlet jacks located in various areas of the airplane, such as wheel wells, fuel panels, equipment bays, cargo holds as well as other areas. Ground crew members can become tangled in the headset cables. Additionally, these tethered cable connections limit ground crew mobility and headset jacks are subject to corrosion and damage because of outdoor exposure and rough use.

BRIEF SUMMARY OF THE INVENTION

In accordance with an embodiment of the present invention, a communications system may include a first transceiver and a second transceiver both mountable to a vehicle. The first transceiver may include a range substantially limited to a close proximity of the vehicle. The communications system may also include a mobile communications device. The mobile communications device may be adapted to receive a signal from the first transceiver when within the range of the first transceiver. The signal may include information useable by the mobile communications device for configuration of the communications device for two-way communications with the second transceiver.

In accordance with another embodiment of the present invention, a method for communications with a specific vehicle may include receiving a signal from a first transceiver mountable to the vehicle when within a range of the first transceiver, wherein the range of the first transceiver may be substantially limited to a close proximity of the vehicle. The method may also include configuring a mobile communications device for two-way communications with a second transceiver based on the signal received from the first transceiver, wherein the second transceiver is mountable to the vehicle.

In accordance with another embodiment of the present invention, a method for communications with a specific vehicle may include mounting a first transceiver to a vehicle, wherein the range of the first transceiver is substantially limited to a close proximity of the vehicle. The method may also include mounting a second transceiver to the vehicle for two-way voice communications with a mobile communications device, wherein the mobile communications device may be configurable for two-way communications with the second transceiver based on a signal received from the first transceiver when the mobile communications device is within the range of the first transceiver.

In accordance with another embodiment of the present invention, a vehicle may include a vehicle structure. The vehicle may also include a first transceiver mountable to the vehicle structure, wherein the first transceiver may include a range substantially limited to a close proximity of the vehicle. The vehicle may also include a second transceiver mountable to the vehicle structure for two-way voice communications with a mobile communications device. The mobile communications device may be configurable for two-way communications with the second transceiver based on a signal received from the first transceiver when the mobile communications device is within the range of the first transceiver.

In accordance with another embodiment of the present invention, a wireless mobile communications device may include a first transceiver to receive a signal including one of a squelch ID code, a signal preamble code, a service set identifier (SSID), a token ID, a frequency, or a channel. The mobile communications device may also include a second transceiver for two-way voice communications. The mobile communications device may further include a processor to configure the mobile communications device for two-way voice communications based on the signal received by the first transceiver.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 1:
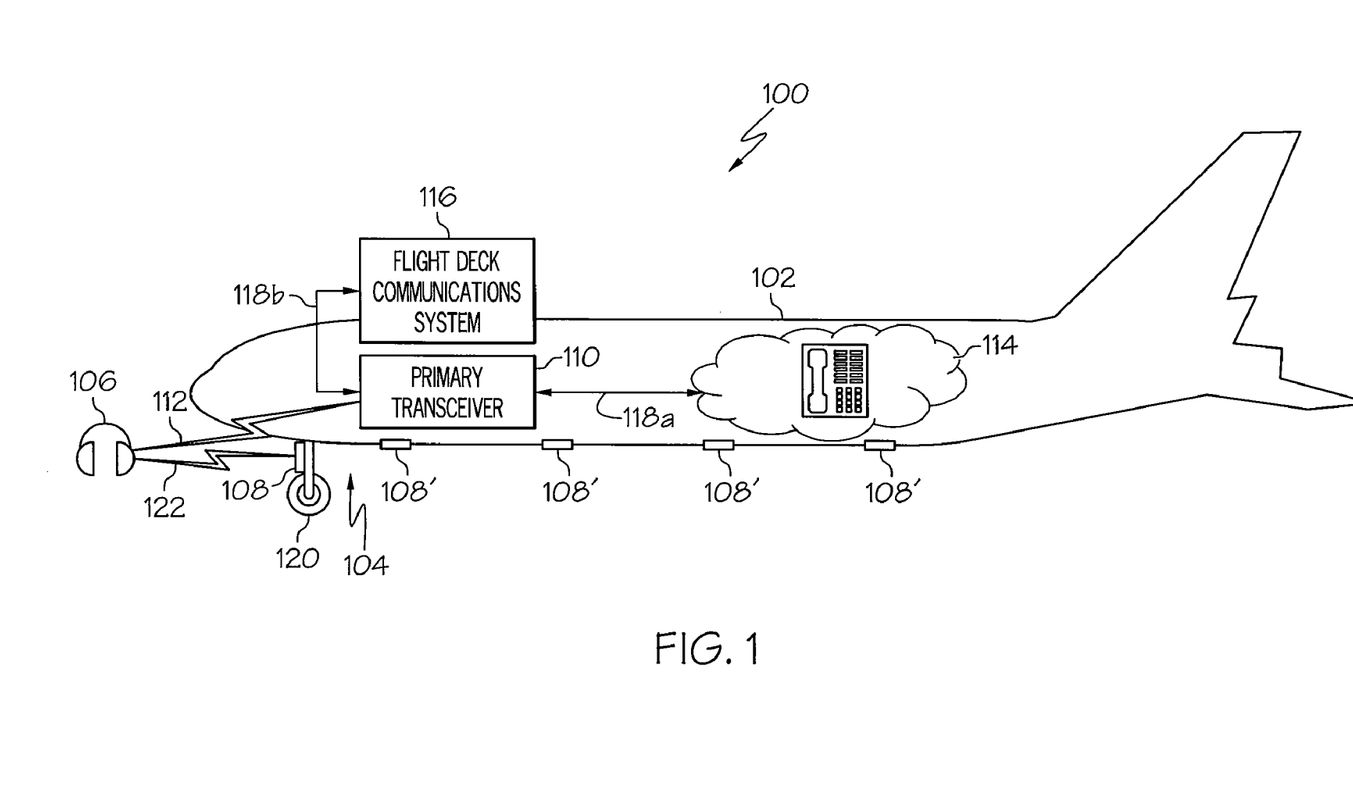
FIG. 1 is an illustration of an example of a wireless communications system for communications with a specific vehicle in accordance with an embodiment of the present invention.

FIG. 1 is an illustration of an example of a wireless communications system 100 for communications with a specific vehicle 102 in accordance with an embodiment of the present invention. The exemplary vehicle 102 shown in FIG. 1 is an airplane; however, the vehicle 102 may be any type of vehicle where the present invention may be applicable, such as in servicing a watercraft or ship, a terrestrial vehicle, for example a bus, or the like. The wireless communication system 100 may also be adapted to any system, machine, place, building, or the like.

The wireless communication system 100 may include wireless or radio communications equipment 104 or devices associated with the vehicle 102 and one or more mobile wireless communications devices 106. The mobile wireless communications device 106 may be a wireless headset or the like that may be used by personnel servicing or otherwise associated with the specific vehicle 102 or aircraft. An example of a mobile wireless communications device that may be used for the device 106 will be described in more detail with reference to FIG. 2.

The communications equipment 104 associated with the vehicle 102 may include a first transceiver or a short-range communications apparatus or transceiver 108 and a second, longer-range transceiver or a primary vehicle communications apparatus or transceiver 110. The first or short-range transceiver 108 and the second or primary vehicle transceiver 110 may be mounted to the vehicle 108 at predetermined strategic locations as will be discussed in more detail. Strategic placement of the short-range transceiver 108 may be of particularly importance with respect to the short-range transceiver 108 or transceivers 108'.

The primary vehicle transceiver 110 may be for primary, sustained communications 112, such as voice communications, between the vehicle 102 and the mobile communications device 106. The primary vehicle transceiver 110 may have a substantially longer range than the short-range transceiver 108. The primary vehicle transceiver 110 may be any type of transceiver, including, but not limited to, a FM modulated VHF radio transceiver or similar radio transceiver.

The primary vehicle transceiver 110 may be coupled to an airplane interphone system 114 and to a flight deck communications system 116 for communications with flight crew or other personnel within the vehicle 102 or aircraft, if the vehicle 102 is an aircraft. The primary vehicle transceiver 110 may be coupled to the airplane interphone system 114 and to the flight deck communications system by a wired or wireless connection 118.

In accordance with one embodiment of the present invention, if the vehicle 102 is an aircraft, the short-range transceiver or communications apparatus 108 may be mounted to a nose wheel landing gear 120. In another embodiment of the present invention, the short-range transceiver 108 may be mounted to a main landing gear (not shown in FIG. 1) or another short-range transceiver 108 may be mounted to one of the main landing gear in addition to the short-range transceiver 108 mounted to the nose wheel landing gear 120. In a further embodiment of the present invention, a plurality of short-range transceivers 108' may be mounted on the vehicle 102 or aircraft at predetermined locations and at about a selected distance from one another to provide substantially complete short-range communications coverage around the vehicle 102 or aircraft.

As described in more detail with reference to FIG. 4, the short-range transceiver 108 may transmit a signal 122 that may include information useable by the mobile communications device 106 for configuration of the communications device 106 for two-way communications 112, such as voice communications, via the primary vehicle transceiver 110. This permits association of the wireless communications device 106 and other such devices with the specific vehicle 102 or aircraft for communications strictly between ground crew members, flight crew members and others that may be associated with the specific vehicle 102. The information in the signal 122 may include one of a squelch code ID, a signal preamble code, a service set identifier (SSID) for IEEE 802.11 or WiFi wireless communications, token ID, frequency, channel or other information for communications with the specific vehicle 102 via the primary transceiver 110. IEEE 802.11 is an Institute of Electrical and Electronic Engineers, Inc. (IEEE) standard for wireless fidelity (WiFi) or wireless local area network (WLAN) communications.

The primary transceiver 110 may be configured to communicate using the squelch ID code, preamble code, SSID, token ID, or tuned to a selected channel or frequency by programming the transceiver 110 via a software download, which may be done over-the-air, or by maintenance personnel setting the transceiver to the proper code, frequency or channel. The transceiver 110 may also automatically acquire the squelch ID, code or the like from an RFID target or other short-range transceiver placed on an equipment tray or rack associated with the primary vehicle transceiver 110.

The short-range transceiver 108 has a range substantially limited to a close proximity of the vehicle. Accordingly, the short-range transceiver 108 may have a signal transmission power to substantially limit the transceiver's range and prevent interference with any other short-range transceivers mounted to another proximately located vehicle. As could be the case at an airport where aircraft may be parked at gates in close proximate to one another. For example, the short-range transceiver 108 may have a selected signal transmission power to limit the range of the transceiver 108 to less than about thirty (30) feet or whatever range may be reasonable to prevent interference from adjacent vehicles or aircraft. This prevents a mobile communications device 106 or headset being used by a ground crew on one aircraft from receiving an information signal 120 from another proximately parked vehicle or aircraft and reconfiguring the ground crew's mobile communications device 106 or headset for the wrong vehicle or aircraft. In this way the ground crew's mobile communications device 106 may be associated with the specific vehicle or aircraft until the mobile communications device 106 is configured for communications with another vehicle as described in more detail with reference to FIG. 4.

In another embodiment of the present invention, once a support person or ground crew member has associated his mobile communications device 106 or headset with a specific vehicle 102 or aircraft by operating a switch, such as switch 208 (FIG. 2) or other means as described herein, the mobile communications device 106 may continue to interrogate for short-range transceivers of nearby vehicles or aircraft. If signals are received from a short-range transceiver of a vehicle or aircraft other than the original or current vehicle, an audible warning, such as a tone, chirp, synthesized voice or the like may be generated by the communications device 106 or headset to alert the support person that he may be near a vehicle or aircraft that his communications device 106 is not associated with.

The short-range communications apparatus or transceiver 108 may be any type of short-range communications apparatus or transceiver, such as, but not limited to, a radio transceiver, a radio frequency identification (RFID) tag or target, a Bluetooth-type transceiver, or other short-range communications apparatus or device, such as an ultrasonic transceiver, an infrared transceiver, a B-field (magnetic) transceiver, or the like. Bluetooth is a trademark or certification mark of Bluetooth SIG, Inc. in the United States, other countries or both.

In another embodiment of the present invention, the vehicle primary transceiver 110 and the short-range transceiver 108 may be integrated into a single device. As such, the integrated transceiver may transmit the signal 122 including the information for configuring the mobile communications device 106.

Figure 2:
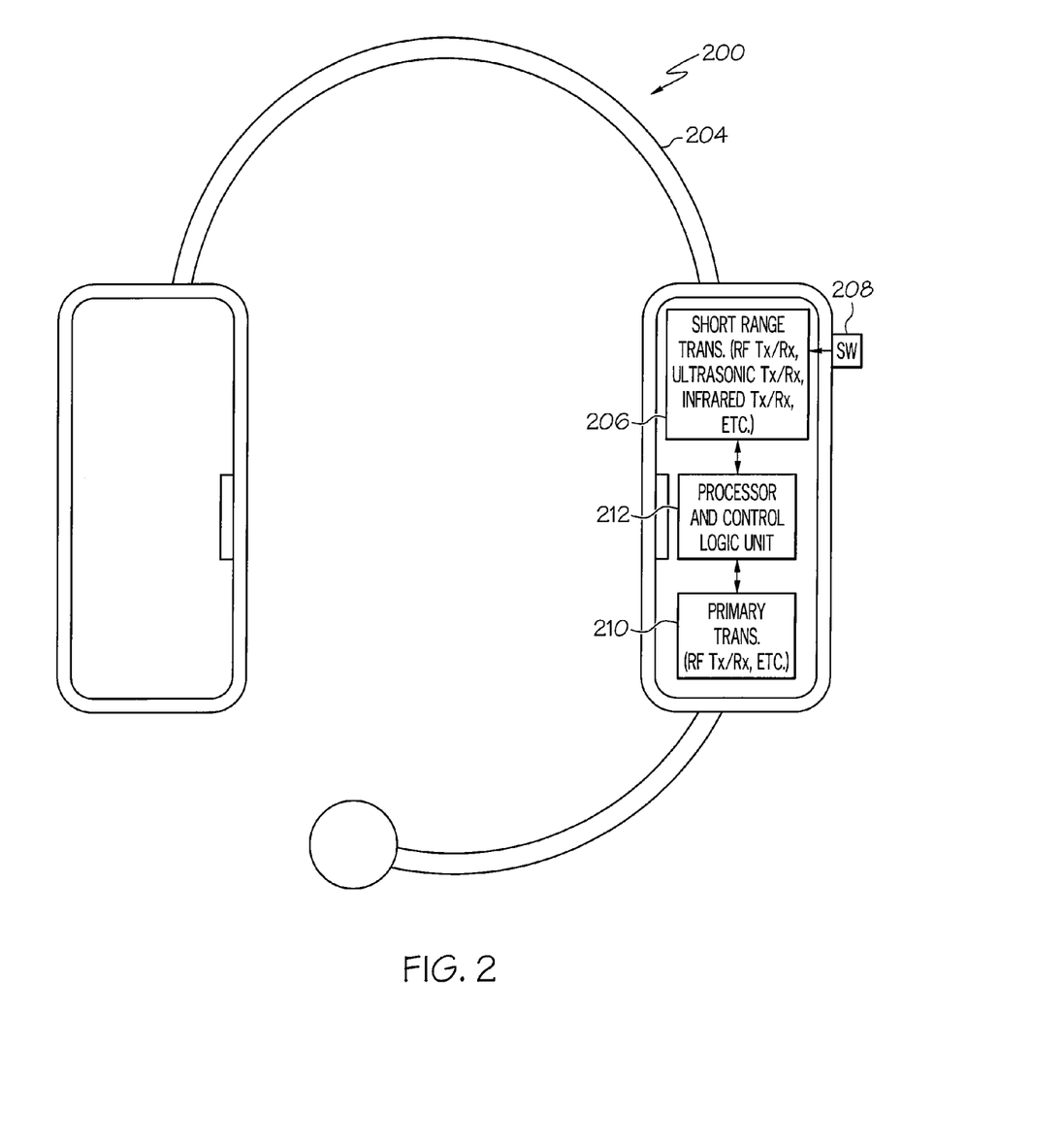
FIG. 2 is an illustration of an exemplary mobile wireless communications device for communications with a specific vehicle in accordance with an embodiment of the present invention.

FIG. 2 is an illustration of an exemplary mobile wireless communications device 200 for communications with a specific vehicle in accordance with an embodiment of the present invention. The mobile communications device 200 may be used for the communications device 106 in FIG. 1. The mobile communications device 200 illustrated in FIG. 2 is in the form of a headset 204. The mobile communications device 200 or headset 204 may include a first, short-range transceiver 206. The short-range transceiver 206 may interrogate the short-range transceiver 108 mounted to the vehicle 102 in FIG. 1 In one embodiment of the present invention, the headset short-range transceiver 206 may be a radio frequency identification (RFID) reader or the like and the vehicle short-range transceiver 108 may be an RFID target. Accordingly, headset RFID reader 206 may interrogate or read the RFID target 108 associated with the specific vehicle 102. The headset RFID reader 206 may read a squelch ID code or other information for configuring the headset 204 from the RFID tag or target when the communications device 200 is placed in close proximity of the RFID target 108. The ground crewperson may simply place the headset 204 near the RFID target (transceiver 108 in FIG. 1) on the vehicle 102 or aircraft to read the squelch ID code or other configuration information. The headset 204 will then be associated with the specific vehicle 102 or aircraft because both will use the same squelch ID, code, frequency, channel or the like. Only the headset 204 and associated vehicle or aircraft can communicate with each other because of the unique squelch ID, code, frequency, channel, etc.

In other embodiments of the present invention, the short-range transceiver 206 may be an ultrasonic transceiver, an infrared transceiver, B-field transceiver or the like in addition to a short-range radio transceiver or similar communications apparatus or device. The short-range transceiver (transceiver 108 or transceivers 108' in FIG. 1) mounted to the vehicle will be compatible with the short-range transceiver 206.

In another embodiment of the present invention, an alternative to placing the wireless headset 204 in close proximity to one of the RFID targets, or short-range transceivers 108 in FIG. 1, may be to increase the range of the short-range transceiver or RFID reader 206 in the headset 204 and add a switch 208 to the headset 204 that activates the short-range transceiver 206. Thus, when the headset 204 is brought within the range of the transceiver 206, a user may activate the switch 208 and the RFID reader or transceiver 206 may ping an RFID target or vehicle mounted transceiver to acquire the squelch ID, code or other configuration information. This can be accomplished from a greater distance from the vehicle or airplane and without having to remove the headset 204. The greater RFID range may require a larger enclosure to accommodate the antenna (not shown) and electronics.

The communications device 200 or headset 204 may also include a second or primary transceiver 210 for two-way voice communications with a vehicle such as the vehicle 102 or aircraft of FIG. 1. The primary transceiver 210 may communicate with a primary transceiver of the vehicle, such as primary transceiver 110 in FIG. 1.

The communications device 200 may further include a processor and control logic unit 212 to configure the mobile communications device 200 or headset 204 for two-way communications based on the signal or squelch ID received by the RFID reader or first, short-range transceiver 206. The processor and control logic unit 212 may be adapted to append a squelch ID code or other code to each communication or signal transmitted by the primary transceiver 210. The processor and control logic unit 212 may also detect a squelch ID code or other code from each signal or communication received to determine if the signal or communication is from an associated or specific vehicle or aircraft. The processor and control logic unit 212 may process or convert the communication to audio signals in response to the squelch ID or other code corresponding to the specific code for the vehicle or aircraft.

In another embodiment of the present invention, the processor and control logic unit 212 may tune the mobile communications device 200 to one of a channel or frequency corresponding to a channel or frequency received from the specific vehicle or aircraft by the short-range transceiver 206 or RFID reader. The channel or frequency received will be the channel or frequency on which the vehicle primary transceiver 110 (FIG. 1) is communicating so that the communications device 200 or headset 204 may be configured or tuned to the frequency or channel for communicating strictly with the specific vehicle or aircraft.

Multiple mobile communications devices, such as device 106 in FIG. 1 or device 200 in FIG. 2, may communicate with the vehicle transceiver 110 (FIG. 1) concurrently. For example, if multiple mobile communications devices assume the same squelch ID of a vehicle's transceiver 110, multiple ground crew members may use these mobile communications devices 106 or 200 simultaneously and thus, communicate with the same vehicle 102 or aircraft by using different mobile communications devices 106.

The squelch ID may be re-assignable. In other words, because vehicles or airplanes will have different squelch IDs, the wireless headset 204 may assume different squelch IDs in order to communicate with other vehicles or aircraft. This may be done when the wireless headset 204 moves into proximity of a short-range transceiver 108 or RFID target of another vehicle. This allows for the RFID reader 206 of the wireless headset 204 to read the short-range transceiver on the other vehicle, acquire the squelch ID code from this short-range transceiver and reconfigure the headset 204 to communicate using this new squelch ID.

As an alternative to using squelch IDs (as explained above), the mobile communications device 106 may, instead, receive a signal preamble code, a SSID, a token ID, a frequency, channel or other information for communicating with the vehicle transceiver 110 of FIG. 1. This information would be transmitted by the short-range transceivers 108. Once this information is received by the mobile communications device 106, the mobile communications device 106 may then tune itself to the frequency or channel of the vehicle transceiver 110 or use the preamble code, SSID, or token ID in communicating with the specific vehicle 102 or aircraft.

Figure 3:
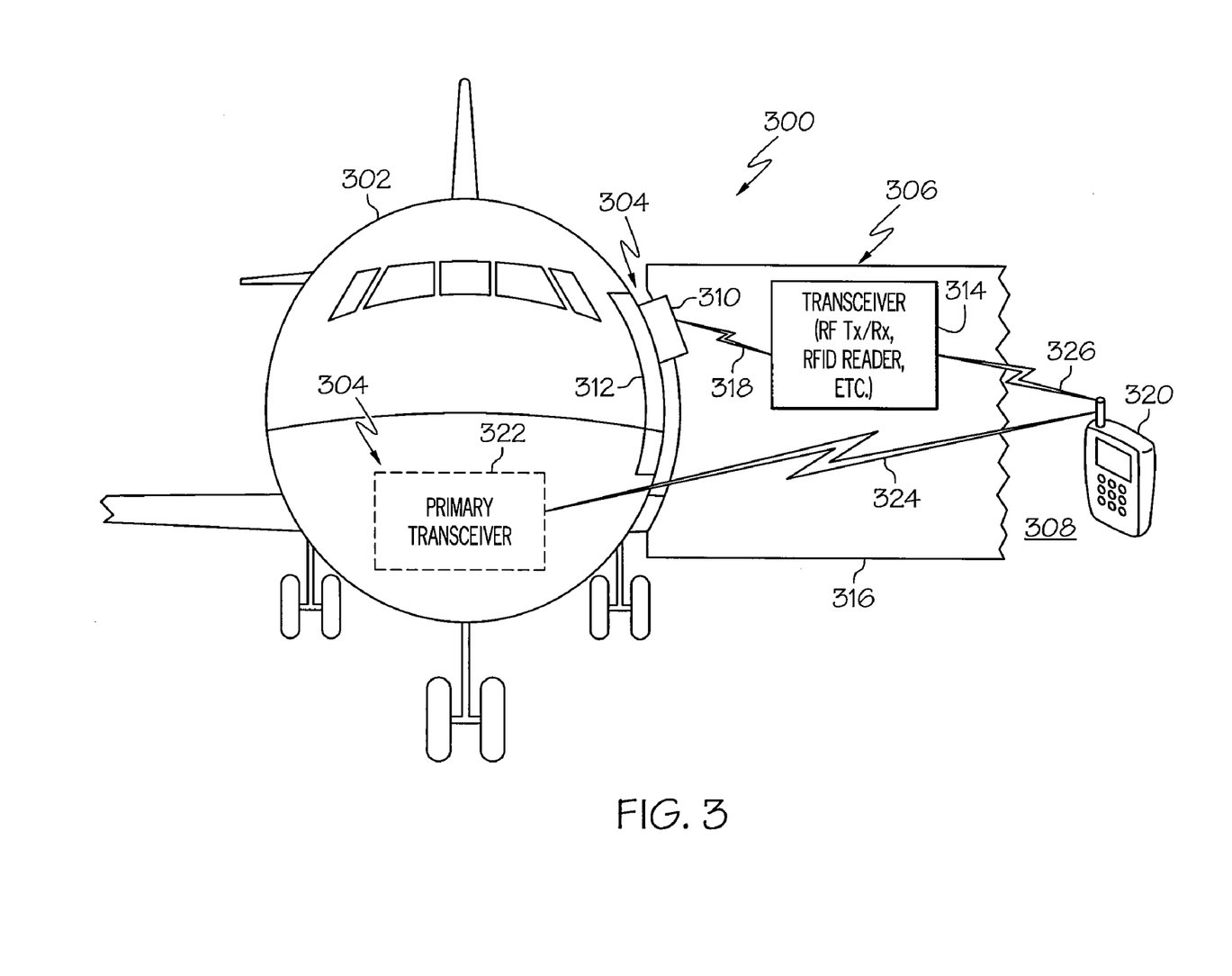
FIG. 3 is an illustration of an example of a wireless communications system for communications with a specific vehicle in accordance with another embodiment of the present invention.

FIG. 3 is an illustration of an example of a wireless communications system 300 for communications with a specific vehicle or aircraft 302 in accordance with another embodiment of the present invention. The system 300 may include communications equipment 304 that may be associated with the vehicle or aircraft 302 and communications equipment 306 that may be ground based or that may be associated with a gate 308 at an airport. The system 300 may include a short-range transceiver 310 that may be similar or the same as the transceiver 108 in FIG. 1. The short-range transceiver 310 may be a RFID tag or target, a radio transceiver, an ultrasonic transceiver, an infrared transceiver, a B-field transceiver or other short-range communications apparatus. The transceiver 310 may be located near a door 312 of the aircraft 302.

The system 300 may also include another transceiver 314 or communications apparatus that may be located in a jet way 316 associated with the gate 308. The jet way transceiver 314 may be a RFID reader, radio transceiver, ultrasonic transceiver, infrared transceiver, B-field transceiver or other communications apparatus. Accordingly, when the aircraft 302 approaches or parks outside the gate 308, the jet way transceiver 314 may be within range of the aircraft short-range transceiver 310 in order to receive a signal 318 from the aircraft transceiver 310. The signal 318 may be similar to the signal 120 described with reference to FIG. 1 and may include information for configuring a wireless gate transceiver 320 for communication 324 with a vehicle primary transceiver 322. Another signal 326 may be transmitted from the jet way transceiver 314 to the wireless gate transceiver 320 including the information for configuring the gate transceiver 320. The vehicle primary transceiver 322 may be similar to the vehicle transceiver 110 described with reference to FIG. 1.

In another embodiment of the present invention, the gate transceiver 320 may also be a wired communications device rather than wireless. For example the gate transceiver may be mounted in a counter, desk or the like, and may be wired to the transceiver 314 or some other unit for communication with the vehicle or aircraft 302.

The system 300 may be combined with the system 100 of FIG. 1 so that flight crew, maintenance crew, gate crew, cabin crew and any others associated with a specific vehicle or aircraft may use wireless communications devices similar to devices 106 or 320 or headsets like headset 204 (FIG. 2) that are configurable for communication with one another in association with a specific vehicle or aircraft.

Figure 4:
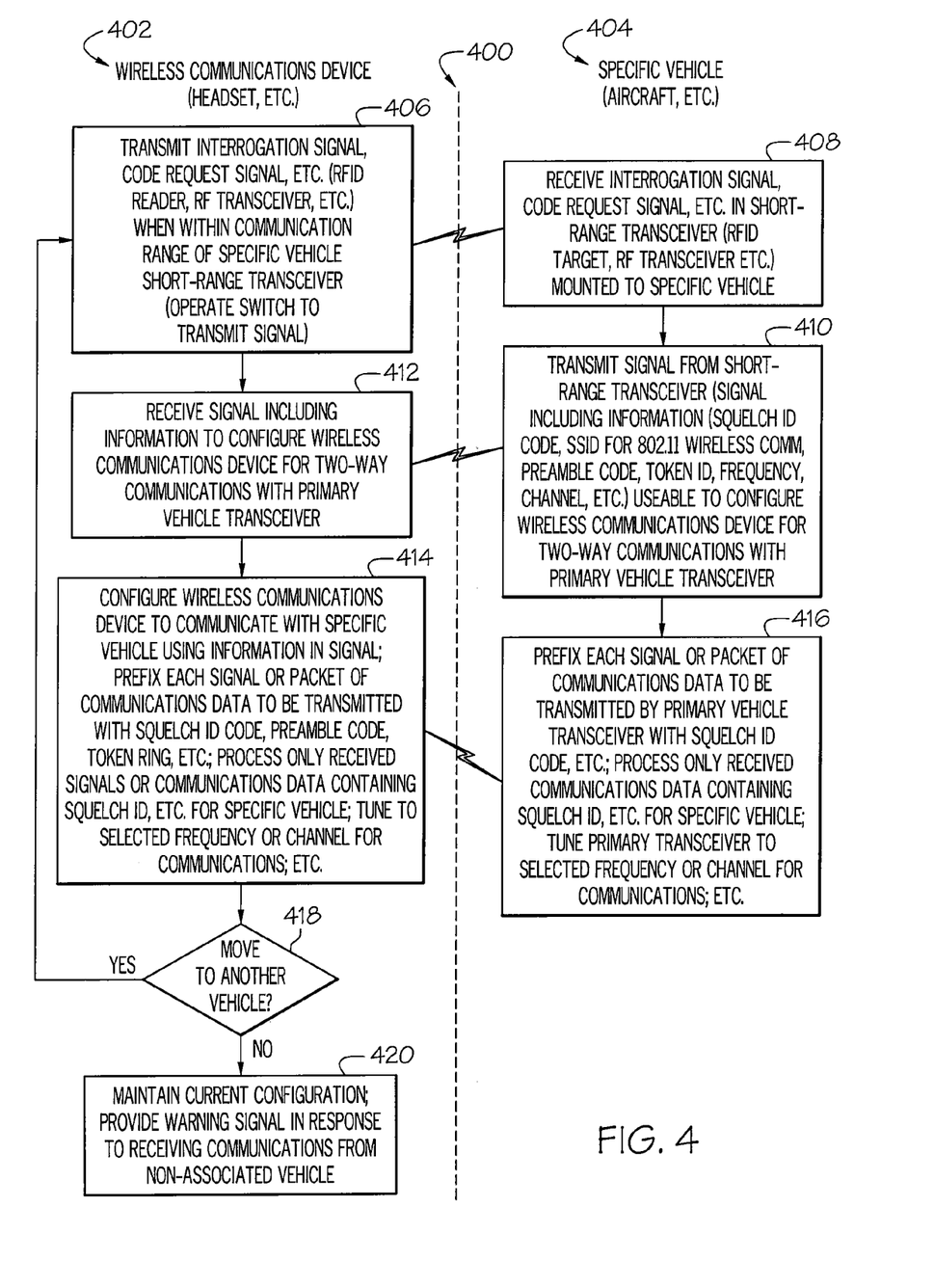
FIG. 4 is a flow chart of an exemplary method for communications with a specific vehicle in accordance with an embodiment of the present invention.

FIG. 4 is a flow chart of an exemplary method 400 for communications with a specific vehicle in accordance with an embodiment of the present invention. FIG. 4 has been divided into a mobile wireless communications device portion 402 to indicate functions or operations that may be performed by a mobile wireless communications device, such as device 106 (FIG. 1) or device 200 (FIG. 2), and a vehicle portion 404 to indicate functions or operations that may be performed by components associated with a vehicle or aircraft, such as vehicle or aircraft 102 in FIG. 1 or vehicle 302 in FIG. 3. The method 400 may be embodied in the systems 100 and 300 of FIGS. 1 and 3, respectively. The wireless communications device portion 402 may be embodied in the wireless communications device 200 of FIG. 2.

In block 406 an interrogation signal, code request signal, ping signal or similar signal may be transmitted by the wireless communications device or headset when within communications range of a first or short-range transceiver associated with the specific vehicle or vehicle that a user of the communications device desires to be able to communicate with others servicing or who are otherwise associated with the vehicle. In block 408, the interrogation signal, code signal or similar signal may be received by the short-range transceiver mounted to the specific vehicle. The short-range transceiver may be a RFID target, Bluetooth type transceiver or similar short-range transceiver similar to short-range transceiver 108 or 310 described with reference to FIGS. 1 and 3, respectively. As previously discussed, the communications device or headset may be placed proximate to the short-range transceiver, such as an RFID target or the like, to interrogate, ping or request to receive a signal including information for the wireless communications device to communicate via the specific vehicle with others associated with the specific vehicle. In another embodiment of the present invention, a switch may be operated by the user to transmit the interrogation signal in block 406 or to cause an RFID reader to ping or read an RFID target as previously described. The switch and operation may be similar to switch 208 described with reference to FIG. 2.

In block 410, a signal may be transmitted from the short-range transceiver including information useable by the communications device for configuration for two-way communications with a second or primary vehicle transceiver. The second or primary vehicle transceiver may be similar to the second or primary vehicle transceiver 110 in FIG. 1 or 322 in FIG. 3. As previously described, the information for configuration of the communications device may be a unique squelch ID code, a SSID for 802.11 wireless communications, a preamble code, a token ID, a frequency, channel or some other information that may be used to configure the communications device for communications in association with only the specific vehicle or aircraft.

In block 412, the signal including the information to configure the wireless communications device for two-way voice communications or the like with the second or primary vehicle transceiver may be received. In block 414, the communications device may be configured for communication with the specific vehicle or aircraft or with others servicing or otherwise associated with the specific vehicle or aircraft using the information in the information signal. Similar to that previously described the communications device may be configured to prefix each signal or packet of communications data to be transmitted with the unique squelch ID code, a preamble code, token ring or the like. The communications device may be further configured to only process received signals or communications data containing the unique squelch ID code or other code for the specific vehicle. In another embodiment of the present invention, the communications device may use the frequency or channel information in the received information signal for configuration or to tune to a unique selected channel or frequency for communications.

In block 416, each signal or packet of communications data to be transmitted by the primary vehicle transceiver may be prefixed with the unique squelch ID code or other prefix. Additionally, only received signals or communications data containing the unique squelch ID or other prefix for the specific vehicle or aircraft may be processed by the primary vehicle transceiver. In the other embodiment of the present invention discussed above, the primary vehicle transceiver may be set or adjusted to transmit and receive signals or communications data only on the selected frequency or channel unique to the specific vehicle or aircraft. In this manner communications devices may be associated with a specific vehicle or aircraft even when other vehicles or aircraft are in close proximate where wireless communications could interfere with each other. Any communications technology or techniques to limit communications among communications devices and a specific vehicle or aircraft may be applicable for the present invention.

In block 418, a determination may be made if the communications device has moved to another vehicle. If not, the communications device will maintain the current configuration in block 420. If the communications device has moved to another vehicle, the method may return to block 406. This operation may involve the headset being placed proximate to the short-range transceiver associated with the new vehicle or aircraft as previously described. Or in another embodiment of the present invention, a switch, such as switch 208 in FIG. 2, may be operated for the wireless communications device to transmit an interrogation signal, request signal or the like to acquire the appropriate information for configuration of the communications device for communications with the new vehicle or aircraft. The method 400 may then proceed as previously described.

In accordance with another embodiment of the present invention, similar to that previously discussed, once a support person or ground crew member has associated his mobile communications device or headset with a specific vehicle or aircraft by operating a switch, such as switch 208 (FIG. 2) or other means as described herein, the mobile communications device may continue to interrogate for short-range transceivers of nearby vehicles or aircraft. If signals are received from a short-range transceiver of a non-associated vehicle or aircraft, or vehicle or aircraft other than the vehicle currently associated with the mobile communications device, an audible warning signal, such as a tone, chirp, synthesized voice or the like, may be generated in block 420 by the mobile wireless communications device or headset to alert the support person that he may be near a vehicle or aircraft with which his communications device is not associated.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A communications system, comprising:
a first transceiver mountable to a vehicle, wherein the first transceiver includes a range substantially limited to a close proximity of the vehicle;
a second transceiver mountable to the vehicle; and
a mobile communications device adapted to receive a signal from the first transceiver when within the range of the first transceiver, wherein the signal includes information useable by the mobile communications device for configuration for direct two-way communications with the second transceiver.

2. The communications system of claim 1, wherein the information comprises one of a squelch ID code, a signal preamble code, a service set identifier (SSID), a token ID, a frequency, and a channel.

3. The communications system of claim 1, wherein the vehicle is one of a group comprising an aircraft, a watercraft, and a terrestrial vehicle.

4. The communications system of claim 1, wherein the first transceiver comprises a signal transmission power to prevent interference with any other short-range transceiver mounted to another proximately located vehicle.

5. The communications system of claim 1, wherein the first transceiver comprises a signal transmission power to limit the range of the first transceiver to less than about thirty (30) feet.

6. The communications system of claim 1, wherein the first transceiver is one of a group comprising a radio frequency identification (RFID) target, a radio transceiver, an ultrasonic transceiver, an infrared transceiver, and a B-field transceiver.

7. The communications system of claim 1, wherein the vehicle is an aircraft and wherein the first transceiver is mounted to one of a nose wheel landing gear and a main landing gear.

8. The communications system of claim 1, further comprising a plurality of first transceivers, each mounted at a predetermined location on the vehicle and at about a selected distance from one another.

9. The communications system of claim 8, wherein the vehicle is an aircraft and one of the plurality of first transceivers is mounted proximate to a door of the aircraft.

10. The communications system of claim 1, wherein the vehicle is an aircraft and the first transceiver is mounted proximate to a door of the aircraft, and wherein the communications system further comprises a third transceiver mountable in a jet way to receive the signal from the first transceiver.

11. The communications system of claim 10, wherein the third transceiver is one of a group comprising a RFID reader, a radio transceiver, an ultrasonic transceiver, an infrared transceiver, and a B-field transceiver to receive the signal from the first transceiver and to transmit another signal to the mobile communications device.

12. The communications system of claim 1, wherein the second transceiver is couplable to at least one of an airplane interphone system and a flight deck communications system of an airplane.

13. The communications system of claim 1, wherein the mobile communications device comprises a wireless headset.

14. The communications system of claim 1, wherein the mobile communications device comprises a mobile transceiver to communicate with the first transceiver and the second transceiver mounted to the vehicle.

15. The communications system of claim 1, wherein the mobile communications device comprises:
a first mobile transceiver to communicate with the first transceiver mounted to the vehicle; and
a second mobile transceiver to communicate with the second transceiver mounted to the vehicle.

16. The communications system of claim 15, wherein the first mobile transceiver is one of a group comprising a RFID reader, a radio transceiver, an ultrasonic transceiver, an infrared transceiver, and a B-field transceiver.

17. The communications system of claim 1, wherein the mobile communications device comprises a processor to perform at least one of a group comprising:
append a prefix to each communication to the second transceiver mounted to the vehicle;
detect a code associated with each communication received by the mobile communications device and convert the communication to audio signals in response to the code corresponding to a specific code received from the first transceiver; and tune the mobile communications device to one of a channel or a frequency corresponding to a channel or frequency received from the first transceiver.

18. The communication device of claim 1, wherein the mobile communications device is located external to the vehicle to receive the signal from the first transceiver.

19. A method for communications with a specific vehicle, comprising:
receiving a signal from a first transceiver mountable to the vehicle when within a range of the first transceiver, wherein the range of the first transceiver is substantially limited to a close proximity of the vehicle; and
configuring a mobile communications device for direct two-way communications with a second transceiver based on the signal received from the first transceiver, wherein the second transceiver is mountable to the vehicle.

20. The method of claim 19, wherein receiving the signal comprises receiving one of a group including a squelch ID code, a signal preamble code, a service set identifier (SSID), a token ID, a frequency, and a channel.

21. The method of claim 19, wherein receiving the signal from the first transceiver comprises reading a RFID target to acquire one of a group including a squelch ID code, a signal preamble code, a service set identifier (SSID), a token ID, a frequency, and a channel.

22. The method of claim 19, further comprising limiting a signal power of the first transceiver to prevent interference with any other first transceivers mounted to another proximately located vehicle.

23. The method of claim 19, wherein receiving the signal from the first transceiver comprises receiving the signal from one of a plurality of first transceivers, wherein each of the plurality of first transceivers are mounted at a predetermined location on the vehicle and at about a selected distance from one another.

24. The method of claim 19, further comprising communicating with a third transceiver located in a jet way of an airport.

25. The method of claim 19, wherein configuring the mobile communications device comprises configuring a wireless headset.

26. The method of claim 19, further comprising performing at least one of a group comprising:
appending a prefix to each communication between the mobile communications device and the second transceiver;
detecting a code associated with each communication received by the mobile communications device and converting the communication to audio signals in response to the code corresponding to a specific code received from the first transceiver; and
tuning the mobile communications device to one of a channel or a frequency corresponding to a channel or frequency received from the first transceiver.

27. The method of claim 19, further comprising providing a warning signal in response to the mobile communications device receiving a communications signal from another vehicle not currently associated with the mobile communications device.

28. A method for communications with a specific vehicle, comprising:
mounting a first transceiver to the vehicle, wherein a range of the first transceiver is substantially limited to a close proximity of the vehicle; and
mounting a second transceiver to the vehicle for two-way voice communications with a mobile communications device, wherein the mobile communications device is configurable for direct two-way communications with the second transceiver based on a signal received from the first transceiver when the mobile communications device is within the range of the first transceiver.

29. The method of claim 28, wherein the vehicle is an aircraft, and wherein the method further comprises mounting the first transceiver to at least one of a nose wheel landing gear and a main landing gear.

30. The method of claim 28, wherein the vehicle is an aircraft, and wherein the method further comprises mounting the first transceiver proximate to a door of the aircraft to communicate with a third transceiver located in a jet way of an airport.

31. A wireless mobile communications device, comprising:
a first transceiver for receiving a signal including one of a squelch ID code, a frequency, a signal preamble code, a service set identifier (SSID), a token ID, and a channel;
a second transceiver for two-way voice communications with a third transceiver mountable on a vehicle; and
a processor for configuring the mobile communications device for direct two-way voice communications with the third transceiver based on the signal received by the first transceiver.

32. The wireless mobile communications device of claim 31, wherein the first transceiver and the second transceiver are integrated.

33. The wireless mobile communications device of claim 31, wherein the first transceiver is one of a group comprising a RFID reader, a radio transceiver, an ultrasonic transceiver, an infrared transceiver, and a B-field transceiver.

34. The wireless mobile communications device of claim 31, wherein the processor and control logic unit is adapted to perform one of the group comprising:
append a prefix to each communication transmitted by the second transceiver;
detect a code associated with each communication received by the second transceiver and convert the communication to audio signals in response to the code corresponding to a specific code received by the first transceiver; and
tune the mobile communications device to one of a channel or a frequency corresponding to a channel or frequency received by the first transceiver.

* * * * *